United States Patent [19]

Lessard et al.

[11] Patent Number: 5,730,355
[45] Date of Patent: Mar. 24, 1998

[54] INFANT INCUBATOR

[75] Inventors: Joseph J. Lessard, Horsham; Robert M. McDonough, Hatfield; Jan F. Wenstrup, Doylestown; Peter Schumann, Richboro, all of Pa.

[73] Assignee: Air-Shields, Inc., Hatboro, Pa.

[21] Appl. No.: 703,793

[22] Filed: Aug. 27, 1996

[51] Int. Cl.⁶ .................................................. A01K 31/20
[52] U.S. Cl. ................................. 237/3; 237/14; 454/195
[58] Field of Search ................................. 237/3, 14, 15; 454/195; 219/400, 385, 386

[56] References Cited

U.S. PATENT DOCUMENTS

| | | |
|---|---|---|
| 3,258,579 | 6/1966 | Dills . |
| 3,648,011 | 3/1972 | Holtkamp . |
| 3,782,362 | 1/1974 | Puzio ........................... 600/22 |
| 3,817,214 | 6/1974 | Bardet . |
| 3,854,452 | 12/1974 | Bardet . |
| 3,859,979 | 1/1975 | Gilliom . |
| 3,870,860 | 3/1975 | Steiner ......................... 392/351 |
| 4,034,740 | 7/1977 | Aterton et al. ............... 600/22 |
| 4,039,775 | 8/1977 | Andra ........................... 219/385 |
| 4,340,859 | 7/1982 | Farley . |
| 4,407,141 | 10/1983 | Paddock ....................... 62/130 |
| 4,572,427 | 2/1986 | Selfridge et al. . |
| 4,689,303 | 8/1987 | Kraft et al. . |
| 4,708,886 | 11/1987 | Nelson . |
| 4,771,269 | 9/1988 | Pasty et al. . |
| 4,946,097 | 8/1990 | Kawamura .................... 237/2 A |
| 5,090,617 | 2/1992 | Swan et al. ................... 236/3 |
| 5,431,339 | 7/1995 | Yoda . |
| 5,453,077 | 9/1995 | Donnelly et al. ............ 600/22 |
| 5,519,188 | 5/1996 | Yuichi et al. . |

Primary Examiner—Henry A. Bennett
Assistant Examiner—Derek S. Boles
Attorney, Agent, or Firm—Ratner & Prestia

[57] ABSTRACT

An infant incubator in which the heater for heating the air circulated through the incubator and the speed of the fan which forces air across the heater to circulate through the incubator are controlled to increase the temperature of the heated air and delivery of the heated air to the space in which an infant has been placed for treatment when an access door of the incubator has been opened. The increase in temperature and delivery of the heated air is caused by a sensor which senses when the access door is opened.

16 Claims, 3 Drawing Sheets

INFANT INCUBATOR

TECHNICAL FIELD

The present invention relates, in general, to infant incubators and, in particular, to apparatus for regulating the heating of the air which is circulated through an infant incubator and introducing the heated air into the space in which an infant is placed for treatment.

BACKGROUND OF THE INVENTION

The most common way for regulating the heating of the air which is circulated through an incubator is to control the power delivered to the heater. An alternative approach, although not as common, is to control the speed of a fan which forces air across the heater and through the incubator. Typically, a temperature sensor, located in the space in which an infant is placed for treatment, and a temperature sensor, attached to the infant, serve as the control for establishing and maintaining the desired temperature of the air to which the infant is exposed.

Incubators have access doors which, when opened, permit access to an infant by those attending to the infant. When an access door is opened, the ambient air can enter the incubator space in which the infant has been placed and change the conditions of the air to which the infant is exposed. As a result, incubators have been arranged with openings extending along the access doors through which incubator air passes to develop warm air curtains which are intended to serve as shields to inhibit the ambient air from entering the space in which the infant has been positioned.

Some incubators are arranged to sense either the access door being opened or a change in temperature in the space in which the infant has been placed and change the heating and delivery of the air which is circulated through the incubator to compensate for the change in conditions by the entry of the ambient air.

SUMMARY OF THE INVENTION

An infant incubator, constructed in accordance with the present invention, includes a hood having an access door in a wall thereof and a base upon which the hood is mounted and having a deck which with the hood defines an enclosure. The deck has openings through which air enters and leaves the enclosure. Also included in this incubator are a heater within the base for heating the air and a fan for supplying air to the heater and heated air from said heater into the enclosure through at least one of the openings and for returning air from the enclosure to the heater through at least one of the openings. An infant incubator, constructed in accordance with the present invention, further includes sensing means responsive to movement of the access door for sensing when the access door is opened and control means responsive to the sensing means for increasing the heat generated by the heater and increasing the speed of said fan when the access door is opened.

DETAILED DESCRIPTION OF THE INVENTION

Figure 1:
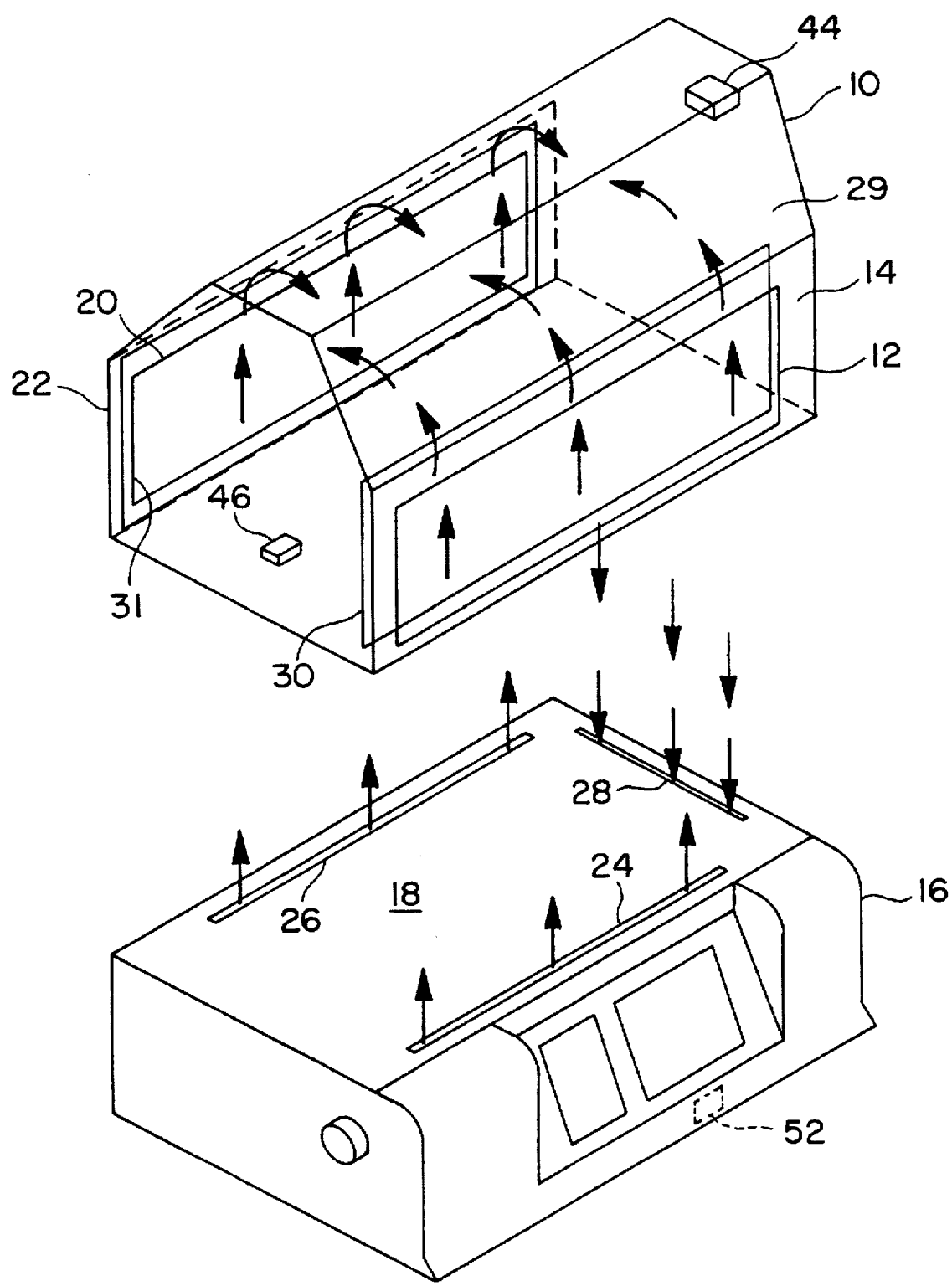
FIG. 1 is an exploded perspective view of an incubator constructed in accordance with the present invention.

Referring to FIG. 1, an infant incubator, constructed in accordance with the present invention, includes a hood 10 having an access door 12 in a wall 14 thereof. This incubator also has a base 16 upon which hood 10 is mounted and having a deck 18 which with the hood defines an enclosure.

Deck 18 has openings through which air enters and leaves the enclosure. For the infant incubator illustrated in FIG. 1 and being described, access door 12 is in a front wall of hood 10 and the hood has a second access door 20 in a rear wall 22 of the hood. Deck 18 has openings 24 and 26 extending along front wall 14 and rear wall 22, respectively, of hood 10. As shown by the arrows in FIG. 1, air enters the enclosure defined by hood 10 and deck 18 through openings 24 and 26 and leaves this enclosure through a third opening 28 extending along a third wall 29 of the hood.

When access door 12 is opened, the air passing through opening 24 in deck 18 forms a warm air curtain which serves as a barrier and reduces the effect of the ambient temperature outside the incubator on the enclosure defined by hood 10 and deck 18. Similarly, a warm air curtain is formed at opening 26 in deck 18 when access door 20 is opened.

An infant incubator, constructed in accordance with the present invention, preferably includes a first inner wall 30 and a second inner wall 31, respectively, secured to and movable with front access door 12 and rear access door 20. Inner walls 30 and 31 reduce radiant heat losses when the respective access doors are closed and serve to carry warm air, introduced through openings 24 and 26 in deck 18, to the top of hood 10 as indicated by the arrows.

Figure 2:
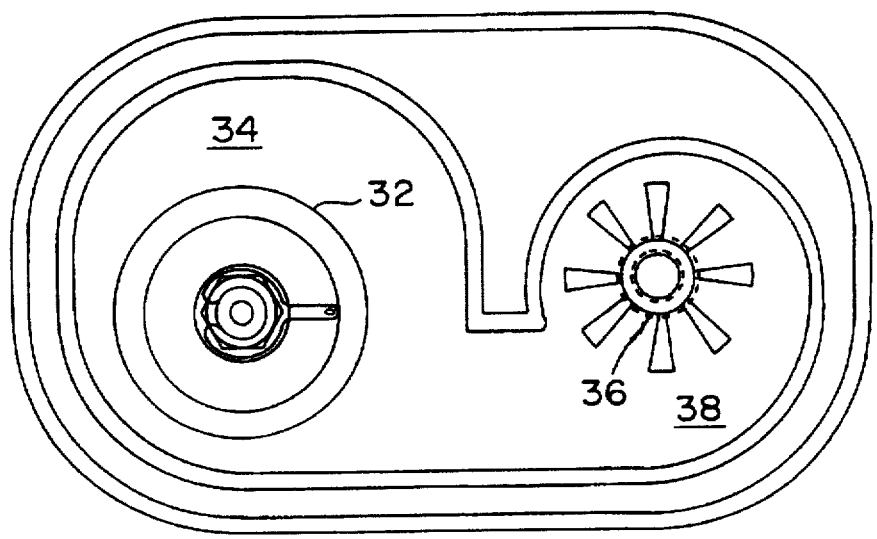
FIG. 2 is a top view of the heater and fan portions of the FIG. 1 incubator.

An infant incubator, constructed in accordance with the present invention, also includes a heater within base 16 for heating the air circulated through the incubator and a fan for supplying air to the heater and heated air from the heater into the enclosure defined by hood 10 and deck 18 through at least one of the openings in the deck and for returning air from this enclosure to the heater through at least one of the openings in the deck. Referring to FIG. 2, a heater 32 is positioned in a first compartment 34 in the base of an incubator. A fan 36 is positioned in a second compartment 38 in the base of the incubator. As fan 36 turns, air is forced past heater 32 and conducted through suitable ducting into the enclosure defined by hood 10 and deck 18 of FIG. 1 and drawn from this enclosure through suitable ducting to the fan for recirculation.

An infant incubator, constructed in accordance with the present invention, also includes sensing means responsive to movements of access doors 12 and 22 for sensing when one or both of these access doors is opened, responsive to the temperature in the enclosure defined by hood 10 and deck 18 for measuring the temperature of this enclosure, and responsive to the skin temperature of an infant being treated in the incubator for measuring the skin temperature of the infant. These sensing means include, as shown in FIG. 3, a magnetic sensor composed of a magnetic reed switch 40 and a magnet 42 responsive to movement of an access door, a first temperature sensor 44, shown in FIG. 1, responsive to the temperature to which an infant being treated in an incubator is exposed, and a second temperature sensor, identified in FIG. 1 by reference numeral 46, responsive to the skin temperature of an infant being treated in the incubator.

Figure 3:
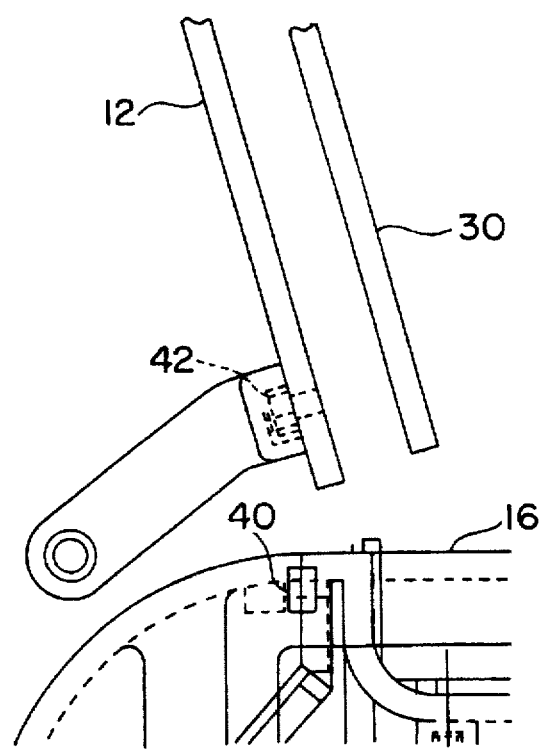
FIG. 3 is a side view of a sensor unit, constructed in accordance with the present invention, by which opening and closing of an access door of an incubator is sensed.

Referring to FIG. 3, which shows the sensing means for access door 12 of hood 10, the sensing means for each door include magnetic reed switch 40 mounted to base 16 and magnet 42 mounted to the access door and movable with the access door into and out of the range of the magnetic reed switch. After access door 12, with magnet 42, is moved a predetermined amount, for example 15 degrees, the magnet comes within the range of magnetic reed switch 40 and the magnetic reed switch is actuated. When access door 12 is closed and magnet 42 moves out of the range of magnetic reed switch 40, the magnetic reed switch opens.

It is common practice to measure the temperature of the enclosure defined by hood 10 and deck 18 and the skin temperature of an infant being treated in an incubator and to use such temperature measurements to regulate the temperature in the enclosure.

An infant incubator, constructed in accordance with the present invention, also includes control means responsive to the magnetic sensor 40, 42 for increasing the heat generated by heater 32 and increasing the speed of fan 36 when an access door is opened. The control means are also responsive to the first temperature sensor 44 and the second temperature sensor 46 for controlling the amount of increased heat generated by heater 32 and the time period over which the increased heat is generated and the amount of increased speed of fan 36 and the time period the fan is operated at the increased speed.

Figure 4:
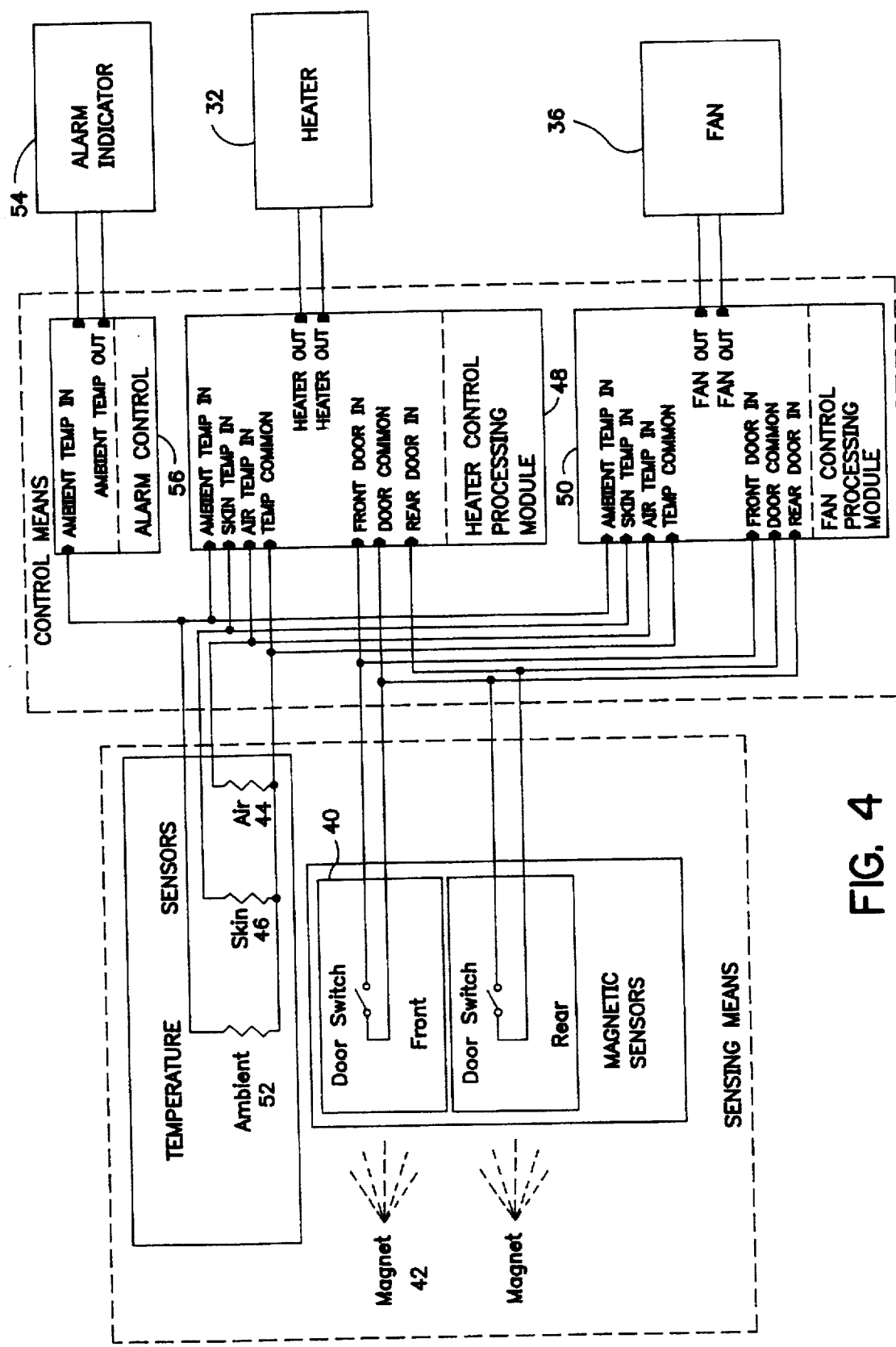
FIG. 4 is a block diagram of the sensor and temperature control portions of an incubator constructed in accordance with the present invention.

Referring to FIG. 4, as one or both of the access doors of an incubator are opened, the magnetic reed switch 42 or 48 associated with the open door or doors closes and signals are supplied to inputs to a heater control processing module 50 and a fan control processing module 52 which, in turn, develop control signals which are supplied from outputs of heater control processing module 50 and a fan control processing module 52 to heater 32 and fan 36 for increasing the heat generated by heater 32 and increasing the speed of fan 36 when an access door is opened. As one or both of the access doors is opened, there is no immediate effect on the air temperature within hood 10 at the location of temperature sensor 44 nor on the skin temperature of the infant at the location of skin temperature sensor 46. Yet it is known that the air temperature in the vicinity of the infant drops when one or both of the access doors is opened. Consequently, the magnetic sensors associated with the access doors "override" the usual control function of air temperature sensor 44 and skin temperature sensor 46 to increase the heat generated by heater 32 and to increase the speed of fan 36 when an access door is opened. When the effect of the access door being opened is sensed by air temperature sensor 44 and by skin temperature sensor 46, control of heater 32 and fan 36 returns to air temperature sensor 44 and skin temperature sensor 46 and the amount of increased heat generated by heater 32 and the time period over which the increased heat is generated and the amount of increased speed of fan 36 and the time period the fan is operated at the increased speed are controlled by air temperature sensor 44 and skin temperature sensor 46 in the usual manner.

It is common practice to include in an infant incubator an alarm indicator when either the difference in actual infant skin temperature and a predetermined set point exceeds a predetermined threshold or the difference in actual air temperature within hood 10 and a predetermined set point exceeds a predetermined threshold. Typically, the alarm indication is delayed a prescribed period of time if the difference between the measured effect and the predetermined set point is due, for example, to a change caused by the operator of the incubator. For example, a significant drop in the skin temperature of the infant due to a change in the condition of the infant or a significant drop in the temperature of the air in the hood due to a failure in the air heating unit, each of which would cause the thresholds to be exceeded, should be alarmed immediately. In contrast, for example, opening an access door or raising the predetermined set point for the temperature of the air within the hood or raising the predetermined set point for the skin temperature of the infant, each of which can cause the difference in actual infant skin temperature and a predetermined set point to exceed a predetermined threshold or the difference in actual air temperature within the hood and a predetermined set point to exceed a predetermined threshold, should not be alarmed and would, in the absence of a delay in the alarm indication, indicate an alarm condition. Therefore, sufficient time is provided before an alarm condition is indicated for the incubator to stabilize when a condition, which might otherwise indicate an alarm condition, is created by the operator of the incubator.

Preferably, an incubator, constructed in accordance with the present invention, includes a third temperature sensor 52, shown in FIGS. 1 and 4, for sensing the ambient temperature outside the incubator and controlling the delay, if any, in actuation of an alarm indicator 54, shown in FIG. 4, when the difference between the actual infant skin temperature and a predetermined set point exceeds a predetermined threshold or the difference in actual air temperature within hood 10 and a predetermined set point exceeds a predetermined threshold. Ambient temperature can be a factor which determines rate at which readings of skin temperature and temperature of the air within the hood recover from readings affected by operator induced changes. Consequently, the control means include an alarm control module 56 which is responsive to ambient temperature sensor 52 for controlling alarm indicator 54 to delay actuation of the alarm indicator depending upon the ambient temperature. For example, the lower the ambient temperature, the longer the delay in actuation of alarm indicator 54 after an open access door is closed.

In addition, ambient temperature sensor 52 can be used to control the heater 32 and fan 36 speed and this is indicated in FIG. 4 by the connections between ambient temperature sensor 52 and heater control processing module 48 and fan control processing module 50. Because ambient temperature can affect the temperature of the air within hood 10, the ambient temperature, at the time an access door is closed, can be another input to controlling heater 32 and fan 36. A range of ambient temperatures can be established by which the power delivered to heater 32 and the speed of fan 36 can be set to be dependent upon the particular ambient temperature at the time the access door was closed.

While there have been described preferred embodiments of the present invention, it should be obvious to those skilled in the art that various modification and changes can be made without departing from the true spirit and scope of the invention.

What is claimed:

1. An infant incubator comprising:
   a hood having an access door in a wall thereof;
   a base upon which said hood is mounted and having a deck which with said hood defines an enclosure and has openings through which air enters and leaves said enclosure;
   a heater within said base for heating the air;
   a fan for supplying air to said heater and heated air from said heater into said enclosure through at least one of said openings and for returning air from said enclosure to said heater through at least one of said openings;
   sensing means responsive to movement of said access door for sensing when said access door is opened; and control means responsive to said sensing means for:
(a) increasing the heat generated by said heater, and
(b) increasing the speed of said fan when said access door is opened.

2. An infant incubator according to claim 1 wherein said sensing means include:
(a) a magnetic reed switch mounted to said base, and
(b) a magnet mounted to said access door of said hood movable with said access door into and out of the range of said magnetic reed switch.

3. An infant incubator according to claim 2 further including a first temperature sensor positioned in said enclosure for sensing the temperature of the air within said enclosure and a second temperature sensor adapted for attachment to the skin of an infant being treated in the incubator.

4. An infant incubator according to claim 3 wherein said control means are also responsive to said first temperature sensor and said second temperature sensor for controlling:
(a) the amount of increased heat generated by said heater and the time period over which said increased heat is generated, and
(b) the amount of increased speed of said fan and the time period said fan is operated at said increased speed.

5. Apparatus for controlling the temperature of an infant incubator comprising:
a heater for heating air circulated within an incubator;
a fan for circulating heated air within the incubator;
sensing means responsive to at least one of:
(a) movement of an access door for sensing when the access door is opened,
(b) the temperature to which an infant being treated in an incubator is exposed, and
(c) the temperature of the skin of an infant being treated in an incubator; and
control means responsive to said sensing means for controlling:
(a) the heat generated by said heater, and
(b) the speed of said fan.

6. Apparatus according to claim 5 wherein:
(a) said sensing means include:
(1) a magnetic sensor responsive to movement of an access door of an incubator for sensing when the access door is opened,
(2) a first temperature sensor responsive to the temperature to which an infant being treated in an incubator is exposed, and
(3) a second temperature sensor responsive to the skin temperature of an infant being treated in an incubator, and
(b) said control means are responsive to:
(1) magnetic sensor for increasing:
(i) the heat generated by said heater, and
(ii) increasing the speed of said fan
when said access door is opened, and
(2) at least one of:
(i) said first temperature sensor, and
(ii) said second temperature sensor
for controlling:
(i) the amount of increased heat generated by said heater and the time period over which said increased heat is generated, and
(ii) the amount of increased speed of said fan and the time period said fan is operated at said increased speed.

7. Apparatus according to claim 6 wherein said magnetic sensor includes:

(a) a magnetic reed switch mounted to a base of an incubator, and
(b) a magnet mounted to an access door of an incubator and movable with the access door into and out of the range of said magnetic reed switch.

8. An infant incubator according to claim 1 wherein:
(a) said access door is in a front wall of said hood,
(b) said hood has a second access door in a rear wall of said hood, and
(c) said deck has:
(1) openings extending along said from wall and said rear wall through which air enters said enclosure, and
(2) an opening extending along a third wall of said hood and through which air leaves said enclosure.

9. An infant incubator comprising:
a hood having a first access door in a from wall thereof and a second access door in a rear wall thereof;
a base upon which said hood is mounted and having a deck which with said hood defines an enclosure and has first and second openings extending along said from wall of said hood and said rear wall of said hood, respectively, through which air enters said enclosure and only one opening extending along a third wall of said hood through which air leaves said enclosure;
a heater within said base for heating the air;
a fan for supplying air to said heater and heated air from said heater into said enclosure through said first opening and said second opening and for returning air from said enclosure to said heater through said opening extending along said third wall;
sensing means responsive to movement of said first access door and movement of said second access door for sensing when either of said access doors is opened; and
control means responsive to said sensing means for increasing at least one of:
(a) the heat generated by said heater, and
(b) the speed of said fan
when either of said access doors is opened.

10. An infant incubator according to claim 3 further including:
(a) a third temperature sensor for sensing ambient temperature outside the incubator,
(b) an alarm indicator for developing an alarm indication when at least one of:
(1) a difference in actual infant skin temperature and a predetermined set point exceeds a predetermined threshold, and
(2) a difference in actual air temperature within said hood and a predetermined set point exceeds a predetermined threshold, and
(c) means responsive to said third temperature sensor for delaying an alarm indication by said alarm indicator by a time period dependent upon the ambient temperature if at least one of:
(1) a difference in actual infant skin temperature and a predetermined set point exceeds a predetermined threshold, and
(2) a difference in actual air temperature within hood and a predetermined set point exceeds a predetermined threshold,
exists and such difference is caused by the operator of the incubator changing operation of the incubator.

11. An infant incubator according to claim 3 wherein:

(a) said sensing means include a third temperature sensor for sensing ambient temperature outside the incubator, and (b) said control means are responsive to said third temperature sensor for:
   (1) controlling the heat generated by said heater, and
   (2) controlling the speed of said fan
   after said access door has been closed.

12. Apparatus according to claim 5 further including:
(a) a third temperature sensor for sensing ambient temperature outside an incubator,
(b) an alarm indicator for developing an alarm indication when at least one of:
   (1) a difference in actual infant skin temperature and a predetermined set point exceeds a predetermined threshold, and
   (2) a difference in actual air temperature within the hood of an incubator and a predetermined set point exceeds a predetermined threshold, and
(c) means responsive to said third temperature sensor for delaying an alarm indication by said alarm indicator by a time period dependent upon the ambient temperature if at least one of:
   (1) a difference in actual infant skin temperature and a predetermined set point exceeds a predetermined threshold, and
   (2) a difference in actual air temperature within a hood of an incubator and a predetermined set point exceeds a predetermined threshold,
   exists and such difference is caused by the operator of the incubator changing operation of the incubator.

13. An infant incubator according to claim 5 wherein:
(a) said sensing means include a third temperature sensor for sensing ambient temperature outside the incubator, and
(b) said control means are responsive to said third temperature sensor for:
   (1) controlling the heat generated by said heater, and
   (2) controlling the speed of said fan
   after said access door has been closed.

14. An infant incubator according to claim 9 wherein said sensing means include:
(a) a magnetic reed switch mounted to said base, and
(b) a magnet mounted to said access door of said hood movable with said access door into and out of the range of said magnetic reed switch.

15. An infant incubator according to claim 14 further including a first temperature sensor positioned in said enclosure for sensing the temperature of the air within said enclosure and a second temperature sensor adapted for attachment to the skin of an infant being treated in the incubator.

16. An infant incubator according to claim 15 wherein said control means are also responsive to said first temperature sensor and said second temperature sensor for controlling:
(a) the amount of increased heat generated by said heater and the time period over which said increased heat is generated, and
(b) the amount of increased speed of said fan and the time period said fan is operated at said increased speed.

* * * * *

UNITED STATES PATENT AND TRADE MARK OFFICE
CERTIFICATE OF CORRECTION

PATENT NO. : 5,730,355
DATED : March 24, 1998
INVENTOR(S) : Joseph J. Lessard, Robert M. McDonough, Jan F. Wenstrup, and Peter Schumann.

It is certified that error appears in the above-identified patent and that said Letters Patent is hereby corrected as shown below:

Column 5, line 3: please insert a paragraph return after the word "fan" and begin a new paragraph with the word "when".

Column 6, line 12: delete "from" and insert --front--.

Column 6, line 18: delete "from" and insert --front--.

Column 6, line 22: delete "from" and insert --front--.

Signed and Sealed this

Thirtieth Day of June, 1998

Attest:

Attesting Officer

BRUCE LEHMAN

Commissioner of Patents and Trademarks